United States Patent [19]

Higurashi

[11] Patent Number: 4,660,104
[45] Date of Patent: Apr. 21, 1987

[54] METHOD FOR RECORDING AND/OR REPRODUCING VIDEO AND AUDIO SIGNALS ON A MAGNETIC TAPE AND A ROTARY CYLINDER ARRANGEMENT THEREFOR

[75] Inventor: Seiji Higurashi, Chiba, Japan

[73] Assignee: Victor Company of Japan, Ltd., Japan

[21] Appl. No.: 644,108

[22] Filed: Aug. 23, 1984

Related U.S. Application Data

[63] Continuation-in-part of Ser. No. 567,977, Jan. 4, 1984, Pat. No. 4,633,332.

[30] Foreign Application Priority Data

Aug. 23, 1983 [JP] Japan ................................ 58-153402

[51] Int. Cl.$^4$ ............................................ A04N 5/782
[52] U.S. Cl. ..................................... 360/19.1; 360/21; 360/84; 358/343
[58] Field of Search ................. 360/19.1, 21, 84, 10.3; 358/343

[56] References Cited

U.S. PATENT DOCUMENTS

| | | | |
|---|---|---|---|
| 3,846,819 | 11/1974 | Warren | 360/84 |
| 4,293,880 | 10/1981 | Tsukada | 360/10.3 |

FOREIGN PATENT DOCUMENTS

| | | | |
|---|---|---|---|
| 87114 | 8/1983 | European Pat. Off. | 360/19.1 |
| 0110375 | 6/1984 | European Pat. Off. | |
| 0117455 | 9/1984 | European Pat. Off. | |
| 3343138 | 5/1984 | Fed. Rep. of Germany | |
| 3400720 | 7/1984 | Fed. Rep. of Germany | |
| 40112 | 3/1977 | Japan | 360/21 |
| 77012 | 6/1980 | Japan | 360/21 |
| 2133604 | 7/1984 | United Kingdom | |
| 2137008 | 9/1984 | United Kingdom | |

Primary Examiner—Alan Faber
Attorney, Agent, or Firm—Lowe, Price, LeBlanc, Becker & Shur

[57] ABSTRACT

Both an audio signal and a video signal are recorded on a video tape (3) by way of a pair of audio heads (Ha1, Ha2) and a pair of video heads (Hv3, Hv4) both mounted on a rotary cylinder (1) of a video tape recorder of helical scan type which can be operated in a standard-time mode and a long-time mode. In the long-time mode, audio tracks (8, 8', 8") are formed successively without having guard bands therebetween, and video tracks (7, 7') are formed upon the audio tracks with guard bands therebetween such that boundaries (L1, L2) between consecutive audio tracks (8, 8', 8") are covered by video track (7, 7'). The audio and video heads are positioned such that the audio heads are advanced by a given angle (T+$\theta$) from the video heads in a direction of the rotation of the cylinder, and the distance (X') between the bottom of the audio heads and the bottom of the video heads is determined as a function of a track pitch (P$_2$), the angular displacement (T+$\theta$) between the video and audio heads, and a desired difference (B) between edges of audio and video tracks to be formed in long-time mode. Two other video heads (Hv1, Hv2), which may be used for only the standard-time mode, may also be provided in addition to the above-mentioned video heads.

9 Claims, 7 Drawing Figures

METHOD FOR RECORDING AND/OR REPRODUCING VIDEO AND AUDIO SIGNALS ON A MAGNETIC TAPE AND A ROTARY CYLINDER ARRANGEMENT THEREFOR

This application is a continuation-in-part application of a co-pending U.S. application Ser. No. 567,977 filed on Jan. 4, 1984, now U.S. Pat. No. 4,633,332, by three inventors including the applicant of the present application, claiming priority from Japanese patent application No. 58-2570.

BACKGROUND OF THE INVENTION

This invention relates generally to video tape recording apparatus, such as a VTR or VCR of helical scan type, and method for recording and/or reproducing video and audio signals on a magnetic tape by way of rotary heads.

In helical scan video tape recorders, two or more rotary heads are provided for recording and/or reproducing a video signal, while a stationary head is usaully provided for recoridng/reproducing an audio signal. Since the highest frequency of the audio signal recorded and subsequently reproduced from a video tape is determined by the relative velocity between the audio head and the tape, such a conventional audio recording/reproducing system using a stationary head is unsatisfactory in view of high-fidelity (Hi-Fi) audio reproduction. Especially, when a VTR is operated in a long-time mode, the tape travelling speed is reduced, and therefore, the relative velocity is also reduced causing deterioration in the quality of reproduced audio signals.

In order to provide a Hi-Fi audio reproduction by way of a helican scan video tape recorder, therefore, various approaches have hitherto been made. According to one conventional technique of a Hi-Fi system an audio signal is converted into a PCM signal to be superimposed on a video signal prior to recording so that a superimposed video and audio signals are simultaneously recorded on a video tape by way of one or more rotary heads. However, this approach is apt to suffer from the occurrence of moire on a reproduced picture due to beat interference between carrier frequencies of the audio and video signals since a frequency modulated audio signal is superimposed on a video signal including a frequency modulated luminance signal and low frequency-converted chrominance signal to be recorded by way of an identical head and subsequently reproduced by the same head.

The inventor of the present invention proposed a new technique for resolving such a conventional problem, and applied for patents in Japan, No. 58-2570 filed Jan. 11, 1983; in the United States, Ser. No. 567,977 filed Jan. 4, 1984; in United Kingdom, No. 8400,548 filed Jan. 10, 1984; and in West Germany, No. P34 00 720.2 filed Jan. 11, 1984. According to the proposed technique rotary heads used for recoring/reproducing only audio signals are provided in addition to rotary video heads so that audio signals are recorded first and then video signals are recorded upon prerecorded audio signals such that video tracks entirely cover audio tracks. Although this technique is satisfactory when prerecorded signals are playbed back at a standard playbak speed, when in long-time playback mode satisfactory audio signal reproduction cannot be performed due to crosstalk between adjacent audio tracks. Especially, crosstalk at low frequency range of audio signals is remarkable, and when such a superimposition technique is adapted to a recording system in which a chrominance signal is frequency modulated as in SECAM system, crosstalk reduction using phase-shift system utilizing correlation between phases of chrominance signals of consecutive horizontal periods does not satisfactorily operate because accurate correlation in phase of chrominance signal does not exist since the chrominance singal is a frequency modulated signal. Although influence by such crosstalk is negligible in standard-time mode because picked up signal level from a right track is sufficiently larger than the crosstalk components from adjacent tracks since each right track is adequately wide, the influence of crosstalk on long-time mode cannot be ignored since the track width is reduced to one half in the case of long-time mode which is twice the standard-time recording period. More specifically, when the track width is reduced to one half, then the signal level from a right track is also reduced to one half compared to the standard-time mode, and signal-to-noise (S/N) ratio is apt to deteriorate. Such deterioration in S/N appears as color signal noise in a reproduced picture. To prevent the occurrence of color signal noise therefore, a further improved technique was devised by the present inventor so that guard bands are provided between video tracks to reduce crosstalk in long-time mode while the width of video tracks is made smaller than one half the track width in standard-time mode.

However, if the width of audio tracks is also reduced in long-time mode together with width reduction of video tracks, S/N of reproduced audio signals deteriorates, and such method of recording cannot be used.

SUMMARY OF THE INVENTION

The present invention has been developed in order to remove the above-described drawbacks inherent to the conventional and preproposed methods of recording video and audio signals on a magnetic tape.

It is, therefore, an object of the present invention to provide new and useful method for recording and/or reproducing video and audio signals on a magnetic tape by way of helical scan rotary cylinder so that both video and audio signals are recorded at high density and reproduced with satisfactory S/N without suffering from crosstalk between adjacent tracks.

According to a feature of the present invention audio tracks are formed successively without having guard bands therebetween in long-time mode, and video tracks are formed upon the audio tracks with guard bands therebetween such that boundaries between consecutive audio tracks are covered by video tracks.

In order to achieve such method of recording, a pair of video heads and a pair of audio heads are provided to a rotary cylinder so that the audio heads are advanced by a given angle from the video heads in a direction of the rotation of the cylinder, and the distance from the bottom of the audio heads to the bottom of the video heads is determined as a function of a track pitch and the angular discplacement between the video and audio heads.

In accordance with the present invention there is provided a method of recording a video signal and an audio signal on a magnetic tape by way of rotary heads, comprising the steps of: forming two audio tracks on said tape such that there is no guard band between said audio tracks; and forming a video track after said audio tracks are formed upon said audio tracks such that a boundary between said audio tracks is covered by said video track.

In accordance with the present invention there is also provided a method of recording and reproducing a video signal and an audio signal on and from a magnetic tape by way of rotary heads, comprising the steps of: forming two audio tracks on said tape such that there is no guard band between said audio tracks; forming a video track after said audio tracks are formed upon said audio tracks such that a boundary between said audio tracks is covered by said video track; and scanning said audio tracks and said video track so as to pickup audio and video signals respectively.

In accordance with the present invention there is further provided a rotary cylinder arrangement for a video tape recorder of helical scan type, comprising: a pair of video heads mounted on said cylinder such that said video heads are spaced apart by 180° with respect to an axis of rotation of said cylinder; and a pair of audio heads mounted on said cylinder such that said audio heads are spaced apart by 180° with respect to said axis, said audio heads being located at positions advanced by a predetemined angle (T+0) from said video heads in a direction of the rotation of said cylinder, said audio heads have a positional relationship in a direction of the height of said cylinder such that a distance X' between a bottom of said audio heads and a bottom of said video heads is given by:

$$X' = (P_2)(T+\theta)/180 + B$$

wherein
$P_2$ is a track pitch of video and audio tracks respectively formed by said video and audio heads;
$T+\theta$ is an angular displacement between said video and audio heads; and
B is given by $0 < B < Wv_3$ ($Wv_3$ represents the width of said video heads).

In accordance with the present invention there is further provided a rotary cylinder arrangement for a video tape recorder of helical scan type arranged to operate in a standard-time mode and in a long-time mode, comprising: a first pair of video heads for said standard-time mode, mounted on said cylinder such that said video heads are spaced apart by 180° with respect to an axis of rotation of said cylinder; a second pair of video heads for said long-time mode, mounted on said cylinder such that said video heads are spaced apart by 180° with respect to an axis of rotation of said cylinder, said first pair of video heads being located at positions advanced by a predetemined angle ($\theta$) from said second pair of video heads in a direction of the rotation of said cylinder, said second pair of video heads having a width in a direction of the height of said cylinder, which width is smaller than a width of said first pair of video heads; a pair of audio heads mounted on said cylinder such that said audio heads are spaced apart by 180° with respect to said axis, said audio heads being located at positions advanced by a predetemined angle (T) from said video heads in said direction of the rotation of said cylinder, said pair of audio heads having a width in a direction of the height of said cylinder, which width is smaller than a width of said first pair of video heads and greater than the width of said second pair of video heads, said video and audio heads have positional relationships in the direction of the height of said cylinder such that a distance X from a bottom of said audio heads and a bottom of said first pair of video heads is given by:

$$X = (P_1 \cdot T/180) + A$$

wherein
$P_1$ is a track pitch of video and audio tracks respectively formed by said first pair of video heads and said pair of audio heads in said standard-time mode;
T is an angular displacement between said first pair of video heads and said audio heads;
A is given by $0 < A < P_1 - Wa$ (Wa represents a width of said audio heads measured along the height of said cylinder), and corresponds to a desired distance between an edge of a video track formed by one of said second pair of video heads, and an edge of an audio track formed by one of said audio heads; and such that a distance X' from a bottom of said audio heads and a bottom of said second pair of video heads is given by:

$$X' = (P_2)(T+\theta)/180 + B$$

wherein
$P_2$ is a track pitch of video and audio tracks respectively formed by said second pair of video heads and said audio heads in said long-time mode, and is given by $P_1/Sr$ wherein Sr is a tape speed ratio between said long-time mode and said standard-time mode;
$\theta$ is an angular displacement between said second pair of video heads and said first pair of video heads;
B is given by $0 < B < Wv_3$ ($Wv_3$ represents the width of said second pair of video heads measured along the height of said cylinder), and corresponds to a desired distance between an edge of a video track formed by one of said second pair of video heads, and a boundary between two consecutive audio tracks formed by said audio heads in said long-time mode.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing an embodiment of the present invention, a recording method, which was devised by the present inventor but is not yet known by public, will be described with reference to a track pattern illustrated in FIG. 1 for a better understanding of the present invention.

Figure 1:
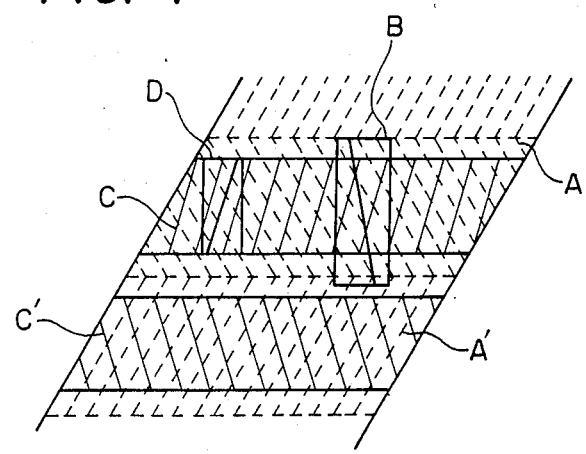
FIG. 1 is a schematic track pattern on a video tape, showing one example formed by way of a technique which was devised by the present inventor prior to the present invention but is not yet known by public.

The reccording method shown in FIG. 1 was devised by the inventor for improving the above-mentioned proposed recording technique. Since audio tracks and video tracks have substantially the same width in long-time mode according to the above-mentioned proposed video and audio recording technique, video signals are apt to suffer from crosstalk from adjacent video tracks. If guard bands are provided with the video track width being reduced, the width of audio tracks is also reduced resulting in deterioration in reproduced sound quality. Therefore, an track pattern of FIG. 1 was devised to provide video tracks with guard bands and audio tracks without guard bands. The track pattern shown in FIG. 1 is obtained when both video and audio signals are recorded by way of a pair of video heads and a pair of audio heads which are both mounted on a rotary cylinder of a video tape recorder of helical scan type. This track pattern is of long-time mode in which the travelling speed of the magnetic recording tape 3 is reduced to one half or so the speed on standard-time mode. The references A and A' indicate audio tracks which are successively formed without guard bands therebetween by way of two audio heads one of which is indicated by the reference B. The references C and C' indicate vidio tracks which are successively formed with guard bands therebetween by way of two vidio heads one of which is indicated by the reference D. The video tracks C and C' are formed with their longitudinal center lines being aligned with longitudinal center lines of audio tracks A and A' after the audio tracks A and A' have been formed. Although the video tracks C and C' do not suffer from crosstalk from adjacent audio tracks C' and C because of the presence of a guard band therebetween, the audio tracks A and A' are apt to suffer from crosstalk from adjacent video tracks A' and A since the audio head B scanning the audio track A also picks up crosstalk components from the adjacent audio track A'.

As will be described in detail hereinlater, according to the present invention boundaries between two consecutive audio tracks are covered by a video track by recording or writing a video signal upon a portion of consecutive audio tracks formed in advance, thereby lowering amplitude of audio signals at boudaries between consecutive audio tracks for reducing crosstalk components. More specifically, the present invention utilizes a phenomena that the amplitude of audio signals picked up from an audio track where a video track is also formed, is lower than an amplitude of audio signals pickup from an audio track where no video track is formed. This technique of forming video tracks upon boundaries of consecutive audio tracks formed in advance is used for long-time recording mode, while audio tracks are formed with guard bands between adjacent audio tracks in standard-time mode.

Figure 2:
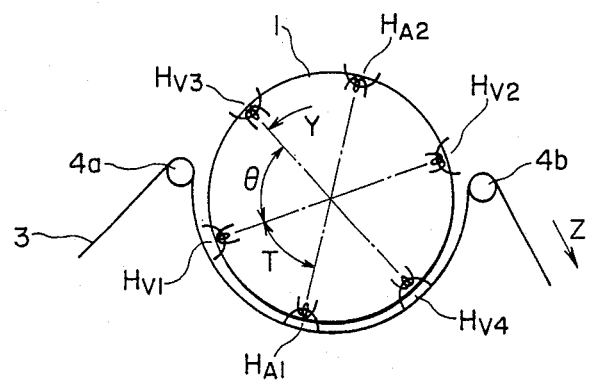
FIG. 2 is a schematic cross-sectional top plan view of rotary cylinder arrangement according to the present invention.
Figure 3:
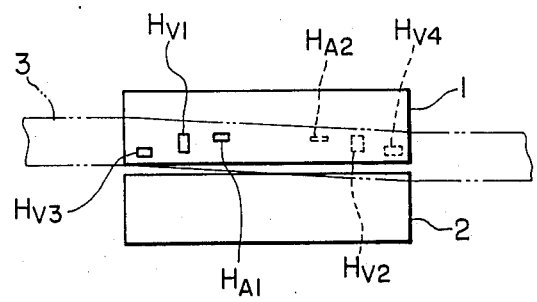
FIG. 3 is a schematic cross-sectional side view of the rotary cylinder arrangement of FIG. 2.

Referring to FIG. 2, a schematic cross-sectional plan view of a rotary cylinder or drum 1 of a video tape recorder to which the present invention is applied is shown. FIG. 3 shows a schematic side view of the rotary cylinder 1 shown in FIG. 2. The reference 3 is a magnetic video tape guided by way of a pair of guide rollers 4a and 4b so that the video tape 3 is wound around the periphery of the cylinder 1 throughout 180° or more degrees. The rotary cylinder 1 is arranged to rotate counterclockwise as indicated by an arrow Y, while the video tape 3 is arranged to move from the left to the right as indicated by an arrow Z in FIG. 2. The rotary cylinder 1 comprises a pair of video heads Hv1 and Hv2 used in standard-time or normal mode, a second pair of video heads Hv3 and Hv4 used in different modes, such as long-time mode. As is well known in the art, the moving speed of the video tape 3 is lowered on the long-time mode from a speed in standard-time mode so that recording/reproducing for a period of time which is twice or more the period of time in standard-time is available when a video tape of a given length is used.

The rotary cylinder 1 also comprises a pair of audio heads Ha1 and Ha2 in addition to the above-mentioned two pairs of video heads Hv1, Hv2, Hv3 and Hv4. The two heads in each of the three pairs of heads, are located with an angular distance of 180° with respect to the axis of rotation of the rotary cylinder 1. More specifically, the video heads Hv1 and Hv2 are positioned at advanced positions from the other video heads Hv3 and Hv4 in the clockwise direction by an angle $\theta$, and the audio heads Ha1 and Ha2 are positioned at advanced positions from the video heads Hv1 and Hv2 in the clockwise direction by an angle T.

As seen in FIG. 3, the video heads Hv1 and Hv2 are located at the same vertical position in the direction of the height of the cylinder 1. Similarly, the other pair of video heads Hv3 and Hv4 are located at the same vertical position, and the audio heads Ha1 and Ha2 are located at the same vertical position.

The rotary cylinder 1 has a lower surface which faces and is spaced apart from an upper surface of a stationary cylinder or drum 2.

Preferably, the video heads Hv1 and Hv2 are oriented so that their azimuths, or vertical settings of head gaps have +6° and −6° inclinations, respectively, and the audio heads Ha1 and Ha2 are oriented so as to provide a greater angular difference therebetween than is provided between video heads Hv1 and Hv2. Suitable azimuths for audio heads Ha1 and Ha2 are −30° and +30°, respectively. The azimuths of other video heads Hv3 and Hv4 are the same as those of the above-mentioned video heads Hv1 and Hv2. These angular relationships minimize mutual interference between audio signals and interference between audio and video signals. The video heads Hv1 and Hv2 will be referred to as standard-time video heads, while the other video heads Hv3 and Hv4 will be referred to as long-time video heads hereinafter.

Although the long-time video head Hv3 and Hv4 scan audio signals recorded by the audio heads Ha1 and Ha2 having the azimuths oriented in the same direction as those of the long-time video heads Hv3 and Hv4, because of the difference in azimuths, interference between audio and video signals is effectively prevented.

Furthermore, according to a feature of the present invention, boundaries between adjacent audio tracks made by the audio heads Ha1 and Ha2 are subjected to superimposing recording of video signals in long-time recording mode, crosstalk between adjacent audio tracks can be effectively prevented thereby providing high-quality reproduced audio signals as will be described in detail hereinlater.

Superimposition of a video signal upon a preformed audio track is effected by recording a video signal on an audio track such that a relatively thin magnetized video track is formed upon an audio track whose depth of magnetized portion is relatively large. In other words, audio signals are recorded deeply while video signals are recorded at only a surface portion of the video tape 3.

In order that video signals are recorded on tracks by way of the long-time video heads Hv3 and Hv4 such that long-time video tracks are superimposed upon boundaries between adjacent audio tracks made by the auduio heads Ha1 and Ha2 in advance, the audio and long-time video heads Ha1, Ha2, Hv3 and Hv4 are respectively have positional relationships therebetween as follows.

Figure 5A:
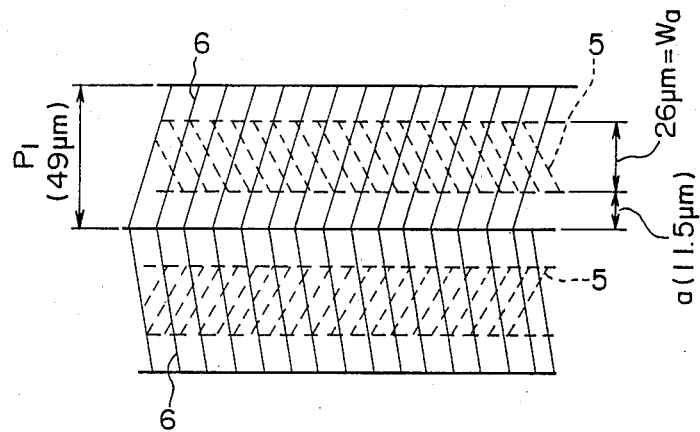
FIGS. 5A and 5B are schematic track patterns respectively formed by the rotary cylinder of FIGS. 2 and 3 on standard-time mode and long-time mode.
Figure 5B:
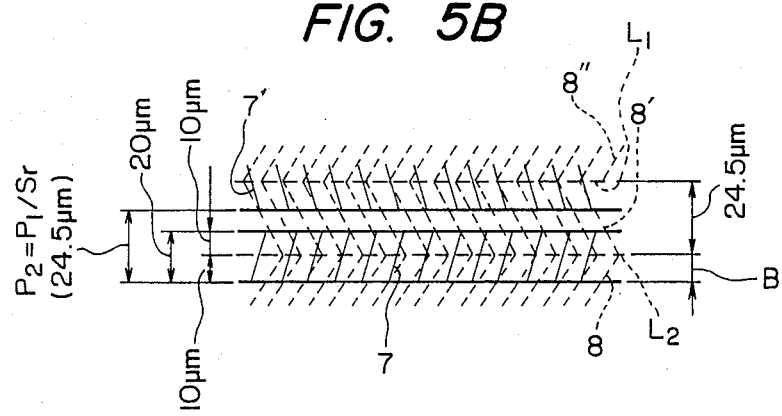
Figure 4:
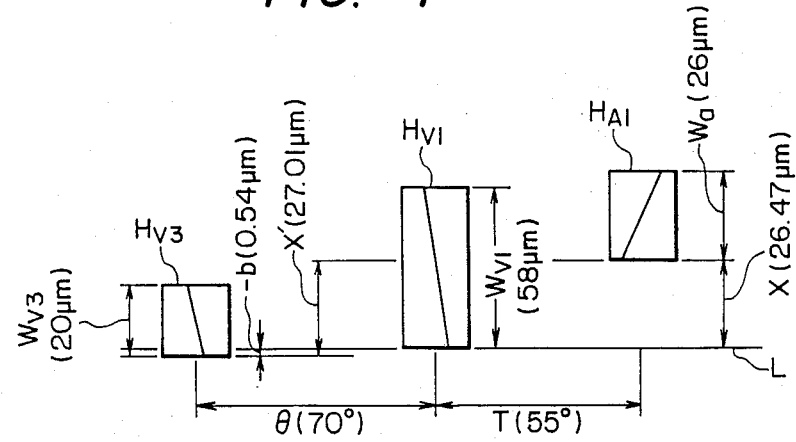
FIG. 4 is a schematic expanded view showing positional relationship between two pairs of video heads and a pair of audio heads all mounted on the rotary cylinder shown in FIGS. 2 and 3.

FIG. 4 shows an expanded view of the cylinder 1 showing the positional relationship between video heads Hv1, Hv2, Hv3 and Hv4 and the audio heads Ha1 and Ha2. FIGS. 5A and 5B respectively show schematic track patterns recorded in standard-time mode and long-time mode respectively. It is assumed that the long-time mode is 6-hour mode, while the standard-time mode is 3-hour mode. This means that the video tape 3 travels, in long-time mode, at a speed one half the speed on standard-time mode. Assuming that the video tap speed in standard-time mode is expresed in terms of Ss, and the video tape speed in long-time mode is expressed in terms of S1, the ratio Sr therebetween is given by:

Sr=S1/Ss

In the case of the above example Sr is 2, and the following description will be made using this tape speed ratio.

The positional relationship in the direction of the height of the cylinder 1 varies as a function of the angular differences T and $\theta$ (see FIG. 2). It is assumed that the diameter of the cylinder 1 is 62 mm the angular difference T between the audio head Ha1 and the standard-time video head Hv1 being 55°, and the angular difference T between the long-time head Hv3 and the standard-time video head Hv1 being 70°. These angles T and $\theta$ may be selected to any desired values as long as T+$\theta$<180°. Since the relationship between the audio head Ha2, and the video heads Hv2 and Hv4 is the same as that between the auduio head Ha1 and the video heads Hv1 and Hv3, FIG. 4 shows only the relationship between the latter three heads.

In a preferred embodiment, the audio head Ha1 has a height of 26 micrometers, while the standard-time and long-time video heads Hv1 and Hv3 respectively have heights of 58 micrometers or more, and 20 micrometers. These heights extending in the direction of the height of the cylinder 1 will be referred to as widths hereinafter because they repsectively define widths of associated tracks. A line L is a reference line which corresponds to the bottom of the standard-time video head Hv1. A reference "X" indicates a distance between the bottom of the auduio head Ha1 and the reference line L, while another reference "b" indicates a distance between the bottom of the long-time head Hv3 and the reference line L.

As seen in FIG. 5A, in the standard-time recording mode, audio tracks 5 are formed by the audio heads Ha1 and Ha2 with guard bands Ga between adjacent audio tracks. Each audio track 5 is entirely covered by subsequently formed video tracks 6 formed by the standard-time video heads Hv1 and Hv2 such that a longitudinal center line of each video track 6 corresponds to a longitudinal center line of each audio track 5. The video tracks 6 are formed successively without guard bands therebetween. More specifically, the video tracks 6 are successively formed such that a portion of an upper edge of a video track is erased by a subsequently formed video track so that video track pitch is 49 micrometers.

Similarly, the audio tracks 5 have also a pitch of 49 micrometers with guard bands of a width of 23 micrometers. As will be understood the track pattern formed in standard-time mode is substantially the same as the track pattern formed according to the aforementioned technique proposed in prior patent applications.

The above-mentioned positional relationship between audio tracks 5 and video tracks 6 formed in standard-time mode will be understood from the following description. Since the track pitch on standard-time mode, which is expressed in terms of $P_1$, is 49 micrometers, the displacement, expressed in terms of D, of the audio track 5 in a transverse direction obtained when the cylinder 1 rotates over an angle T is given by:

D=49T/180

Assuming that a distance between a lower edge of the video track 6 and a lower edge of the audio track 5 is expressed in terms of "a", we obtain the following relationship:

$$X = (P_1 \cdot T)/180 + a \quad (1)$$

The value of "a" is given by the following formula when the video track 6 is formed as described in the above with its longitudinal center line corresponding to the longitudinal center line of the preformed audio track 5:

$$a = (P_1/2) - (Wa/2)$$

wherein Wa is a width of the audio head Ha1.

Using 49 micrometers and 26 micrometers for $P_1$ and Wa respectively, we obtain:

a=11.5 micrometers

In order that the video tracks 6 are fomred as illustrated in FIG. 5A, therefore, the audio head Ha1 has to be positioned so that its bottom is above the reference line L by X given by the above formula (1).

Using 11.5 micromerters for "a" and 55° for T, we obtain:

X=26.47 micrometers.

In long-time mode, audio tracks are successively formed without guard bands therebetween by the audio heads Ha1 and Ha2 as shown in FIG. 5B where the width of each audio track 8 is 24.5 micrometers because the tape speed is reduced to one half the speed in standard-time mode. In detail, the width of audio tracks 8, 8', 8" is given by: P1/Sr, and using 49 micrometers and 2 for P1 and Sr respectively, we obtain a track pitch P2=24.5 micrometers of audio tracks 8, 8', 8" in long-time mode. After, two adjacent audio tracks, such as 8' and 8, are succesively formed, a video track 7 is formed by the long-time video head Hv1. In this way video tracks 7 are formed upon the preformed audio tracks such that guard bands are formed between adjacent video tracks 7 and 7'. The references L1 and L2 indicate boundaries between adjacent auduio tracks 8, 8' and 8". The video tracks 7 and 7' are preferably formed such that a longitudinal center line of each video track 7, 7' corresponds to each boundaries L1, L2. To form such video tracks 7 and 7' upon preformed audio tracks 8, 8' and 8", the long-time video heads Hv3 is positioned as follows:

Assuming that the video head Hv3 is positioned such that its bottom is above the reference line L by "b", the distance X' between the bottom of the audio head Ha1 and the bottom of the long-time video head Hv3 is given by:

$$X' = X - b$$

In order that the long-time video tracks 7, 7' are formed such that its longitidinal center lines respectively correspond to the boundaries L1, L2 between consecutive audio tracks 8, 8', 8'', the above X' has to have the following relationship:

$$X' = (P_1/Sr)(T\theta)/180 + (Wv_3/2) \quad (2)$$

wherein $Wv_3$ is the width of the long-time head Hv3.

Using the above-mentioned values for P1, Sr, T and $\theta$, and 20 micrometers for $Wv_3$, we obtain:

$$X' = (49/2)(55 + 70)/180 + (20/2)$$
$$= 27.01 \text{ micrometers}$$

Since X' is greater than X, the bottom of the long-time video head Hv3 is located below the reference line L by 0.54 micrometers as shown in FIG. 4. The above numerals indicating the positional relationship between heads Ha1, Hv1 and Hv3 are obtained when the heads have angular relationship with respect to the axis of the cylinder 1 is such that T is 55° and 0 is 70° while the tape speed ratio Sr is 2. Thus, the above formulas (1) and (2) may be written as:

$$X = (P_1 \cdot T/180) + A$$

wherein A is given by $0 < A < P_1 - Wa$ because the audio tracks 5 are entirely covered by each of the standard-time video tracks 6 as long as A has the above relationship.

$$X' = (P_1/Sr)(T+\theta)/180 + B$$

wherein B is given by $0 < B < Wv_3$ because the boundaries L1, L2 are entirely covered by each of the long-time video tracks 7, 7' as long as B has the above relationship.

As seen in the track patterns in FIGS. 5A and 5B, audio signals are recoreded on audio tracks 5 with guard bands therebetween in standard-time mode, and therefore, possible crosstalk between adjacent audio tracks 5 is effectively prevented. As a result, signal-to-noise (S/N) ratio of the audio signals is not deteriorated thereby high quality audio reproduction can be expected. On the other hand, in long-time mode, the boundaries L1 and L2 between adjacent audio tracks 8, 8' and 8'' are entirely covered by video tracks 7 and 7', and therefore crosstalk between adjacent audio tracks is effectively prevented as follows. When a video signal is superimposed upon an audio signal, the amplitude of a reproduced audio signal is reduced compared to the case of no superimposition. Therefore, the crosstalk level from an adjacent audio track to an audio track is lower than the crosstalk level obtained when no superimposition is effected. For this reason, audio signals on adjacent tracks can be reproduced with a satisfactory S/N ratio thereby providing a high quality reproduced sound. Furthermore, even if crosstalk occurs from audio tracks to video tracks, the level of such crosstalk is negligibly low because the video signal is a frequency modulated signal. Moreover, due to the difference in azimuth of the audio heads Ha1 and Ha2 and the video heads Hv3 and Hv4, crosstalk is also prevented owing to azimuth loss.

Figure 6:
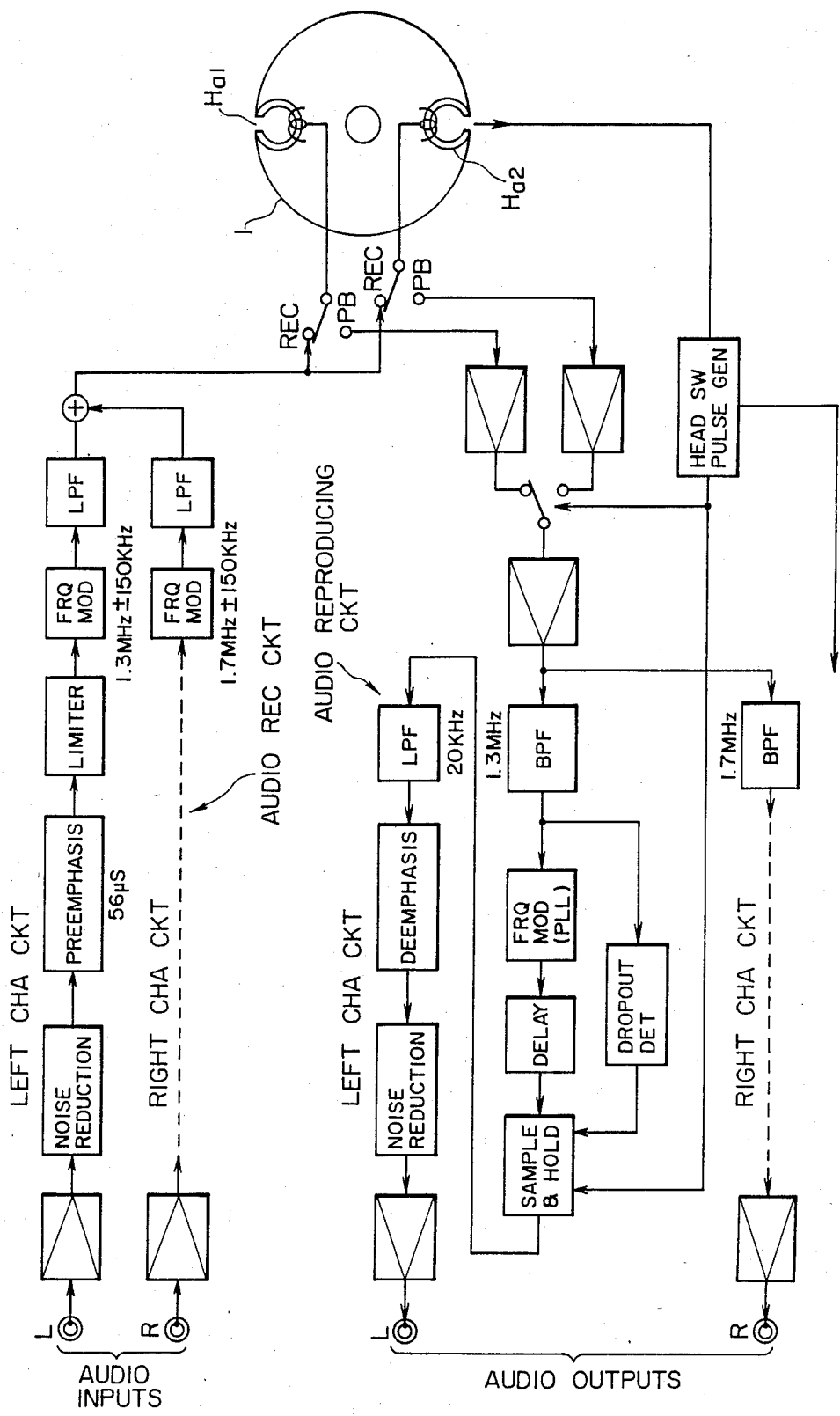
FIG. 6 is a schematic block diagram of a video tape recorder to which the present invention is applicable.

FIG. 6 is a block diagram showing a part of a video tape recorder to which the present invention is applied. The block diagram shows an audio recording circuit and audio reproducing circuit. The recording and reproducing circuits are arranged to handle left and right channel audio signals, and some circuits for the right channel identical with those in left channel circuits are shown by way of dotted lines for simplicity. In the recording circuit, left channel signal is frequency modulated where the carrier frequency is 1.3 MHz, and the right channel signal is also frequency modulated where the carrier frequency is 1.7 MHz. These frequency modulated signals are added to each other and are fed to the audio heads Ha1 and Ha2. In the reproducing circuit responsive to an audio signal picked up by the audio heads Ha1 and Ha2, one of output signals from the two audio heads Ha1 and Ha2 is selected in response to a head switching pulse, and then left and right channel signals are derived by way of band pass filters, and then the left and right channel signals are frequency demodulated respectively.

From the above it will be understood that the using efficiency of the entire area of a magnetic video tape can be improved without deteriorating the quality of reproduced audio and video signals. Although the long-time video heads Hv3 and Hv4 are used in addition to the standard-time video heads Hv1 and Hv2, the present invention may be applicable to a video tape recorder having only a single pair of video heads used for both standard-time and long-time modes. Furthermore, the time length ratio Sr between the standar-time mode and the long-time mode may be changed to any desired value, such as 3 or so.

The above-described embodiments are just examples of the present invention, and therefore, it will be apparent for those skilled in the art that many modifications and variations may be made without departing from the spirit of the present invention.

What is claimed is:

1. A method of recording a video signal and an audio signal on a magnetic tape by way or rotary heads, comprising the steps of:
   (a) forming two audio tracks on said tape such that there is no guard band between said audio tracks; and
   (b) forming a video track after said audio tracks are formed upon said audio tracks such that a boundary between said audio tracks is covered by said video track.

2. A method of recording a video signal and an audio signal as recited in claim 1, comprising the further step of forming a particular track pattern of audio and video tracks where said video track bridges over two audio tracks so that an amplitude of a reproduced audio signal from areas covered by said video track is smaller than an amplitude of a reproduced audio signal obtained from areas uncovered by said video track.

3. A method of recording and reproducing a video signal and an audio signal on and from a magnetic tape by way of rotary heads, comprising the steps of:
   (a) forming two audio tracks on said tape such that there is no guard band between said audio tracks;

(b) forming a video track after said audio tracks are formed upon said audio tracks such that a boundary between said audio tracks is covered by said video track; and (c) scanning said audio tracks and said video track so as to pickup audio and video signals respectively.

4. A method of recording and reproducing a video signal and an audio signal as recited in claim 3, comprising the further step of forming a particular track pattern of audio and video tracks where said video track bridges over two audio tracks so that an amplitude of a reproduced audio signal from areas covered by said video track is smaller than an amplitude of a reproduced audio signal obtained from areas uncovered by said video track.

5. A rotary cylinder arrangement for a video tape recorder of helical scan type, comprising:

(a) a pair of video heads mounted on said cylinder such that said video heads are spaced apart by 180° with respect to an axis of rotation of said cylinder;

(b) a pair of audio heads mounted on said cylinder such that said audio heads are spaced apart by 180° with respect to said axis, said audio heads being located at positions advanced by a predetermined angle $(T+\theta)$ from said video heads in a direction of the rotation of said cylinder, said audio heads have a positional relationship in a direction of the height of said cylinder such that a distance $X'$ between a bottom of said audio heads and a bottom of said video heads is given by:

$$X' = (P_2)(T+\theta)/180 + B$$

wherein $P_2$ is a track pitch of video and audio tracks respectively formed by said video and audio heads;

$T+\theta$ is an angular displacement between said video and audio heads; and

B is given by $0 < B < Wv_3$ ($Wv_3$ represents the width of said video heads).

6. A rotary cylinder arrangement as claimed in claim 5, wherein said B is substantially equal to $Wv_3/2$.

7. A rotary cylinder arrangement for a video tape recorder of helical scan type arranged to operate in a standard-time mode and in a long-time mode, comprising:

(a) a first pair of video heads for said standard-time mode, mounted on said cylinder such that said video heads are spaced apart by 180° with respect to an axis of rotation of said cylinder;

(b) a second pair of video heads for said long-time mode, mounted on said cylinder such that said video heads are spaced apart by 180° with respect to an axis of rotation of said cylinder, said first pair of video heads being located at positions advanced by a predetemined angle ($\theta$) from said second pair of video heads in a direction of the rotation of said cylinder, said second pair of video heads having a width in a direction of the height of said cylinder, which width is smaller than a width of said first pair of video heads;

(c) a pair of audio heads mounted on said cylinder such that said audio heads are spaced apart by 180° with respect to said axis, said audio heads being located at positions advanced by a predetemined angle (T) from said video heads in said direction of the rotation of said cylinder, said pair of audio heads having a width in a direction of the height of said cylinder, which width is smaller than a width of said first pair of video heads and greater than the width of said secon pair of video heads, said video and audio heads have positional relationships in the direction of the height of said cylinder such that a distance X from a bottom of said audio heads and a bottom of said first pair of video heads is given by:

$$X = (P_1 T/180) + A$$

wherein $P_1$ is a track pitch of video and audio tracks respectively formed by said first pair of video heads and said pair of audio heads in said standard-time mode;

T is an angular displacement between said first pair of video heads and said audio heads;

A is given by $0 < A < P_1 - Wa$ (Wa represents a width of said audio heads measured along the height of said cylinder), and corresponds to a desired distance between an edge of a video track formed by one of said second pair of video heads, and an edge of an audio track formed by one of said audio heads; and such that a distance $X'$ from a bottom of said audio heads and a bottom of said second pair of video heads is given by:

$$X' = (P_2)(T+\theta)/180 + B$$

wherein $P_2$ is a track pitch of video and audio tracks respectively formed by said second pair of video heads and said audio heads in said long-time mode, and is given by $P_1/Sr$ wherein Sr is a tape speed ratio between said long-time mode and said standard-time mode;

$\theta$ is an angular displacement between said second pair of video heads and said first pair of video heads;

B is given by $0 < B < Wv_3$ ($Wv_3$ represents the width of said second pair of video heads measured along the height of said cylinder), and corresponds to a desired distance between an edge of a video track formed by one of said second pair of video heads, and a boundary between two consecutive audio tracks formed by said audio heads in said long-time mode.

8. A rotary cylinder arrangement as claimed in claim 7, wherein said distance A is substantially equal to $(P_1/2) - (Wa/2)$, and said B is substantially equal to $Wv_3/2$.

9. A rotary cylinder arrangement as claimed in claim 7, wherein the two video heads of said first and second pairs of video heads have different azimuth from each other, and the two audio heads have different azimuth from each other, where the azimuths of said audio heads are greater than the azimuths of said first and second pairs of video heads.

* * * * *